United States Patent [19]

Dec et al.

[11] Patent Number: 5,045,029
[45] Date of Patent: Sep. 3, 1991

[54] PULLEY ENCASED TENSIONER WITH DAMPING

[75] Inventors: Andrzej Dec; Henry W. Thomey, both of Windsor, Canada

[73] Assignee: Gates Power Drive Products, Inc., Bloomfield Hills, Mich.

[21] Appl. No.: 630,593

[22] Filed: Dec. 20, 1990

[51] Int. Cl.⁵ ............................................. F16H 7/12
[52] U.S. Cl. .................................. 474/112; 474/135
[58] Field of Search ............ 474/94, 112, 133, 135, 474/139, 143, 164, 165

[56] References Cited

U.S. PATENT DOCUMENTS

| | | | |
|---|---|---|---|
| 4,351,636 | 9/1982 | Hager | 474/138 |
| 4,808,148 | 2/1989 | Holtz | 474/135 |
| 4,816,012 | 3/1989 | Bytzek | 474/135 |
| 4,824,421 | 4/1989 | Komorowski | 474/112 |

*Primary Examiner*—Ramon S. Britts
*Assistant Examiner*—Roger J. Schoeppel
*Attorney, Agent, or Firm*—H. W. Oberg; C. H. Castleman, Jr.

[57] ABSTRACT

A tensioner with a pulley rotatably mounted to a pivot arm that is biased with a compression spring. The pulley is generally tube-pan shaped and defines an annular space where the compression spring is located. A belt drive system of the automotive camshaft type that includes the tensioner for maintaining operative belt tension.

8 Claims, 1 Drawing Sheet

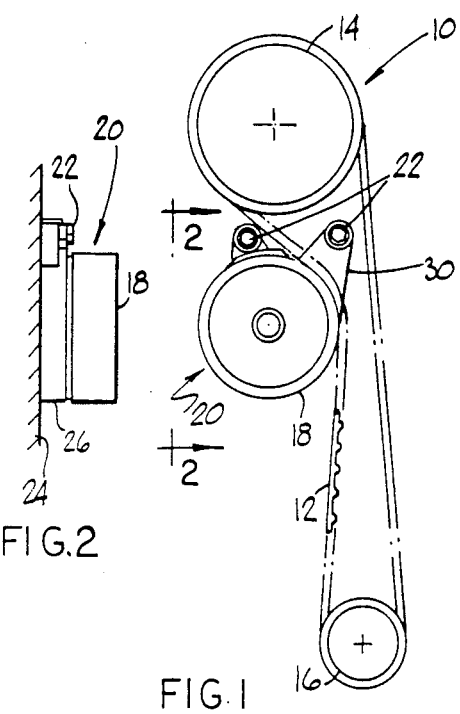
FIG.2
FIG.1
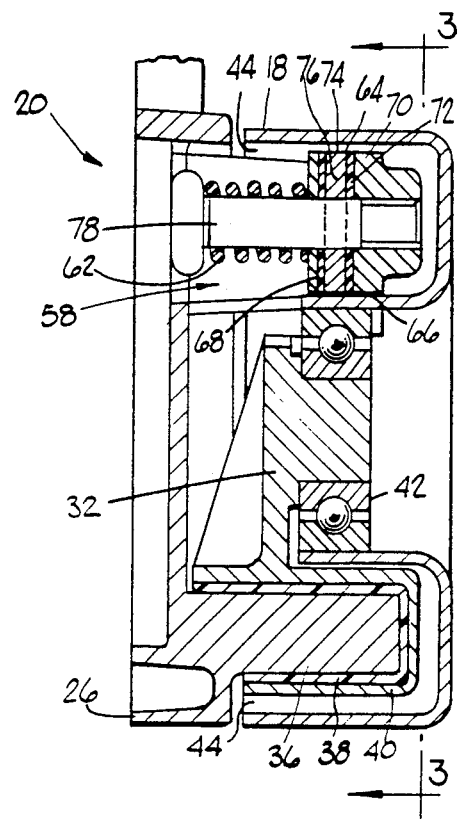
FIG.4
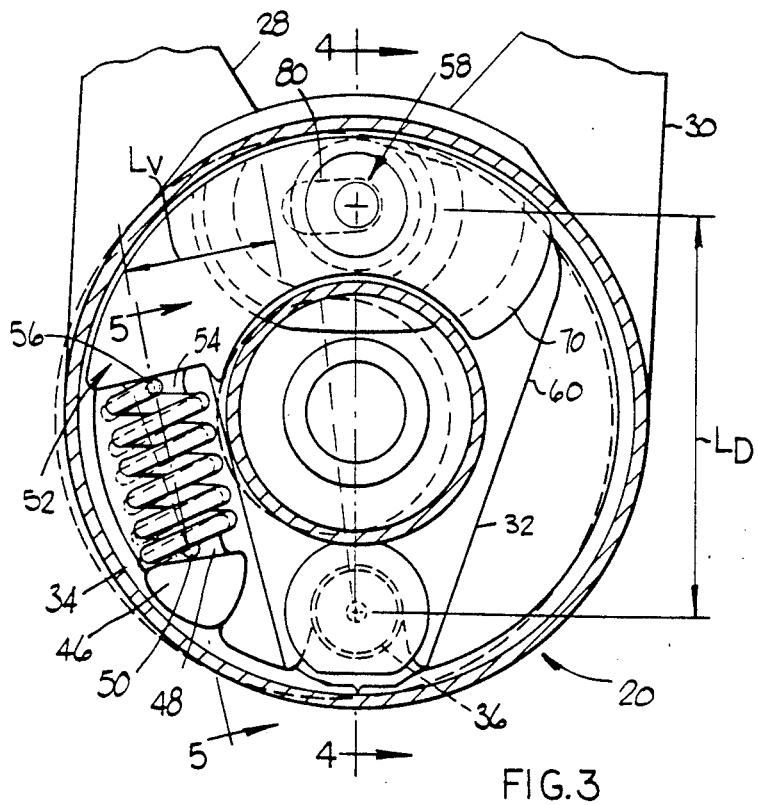
FIG.3
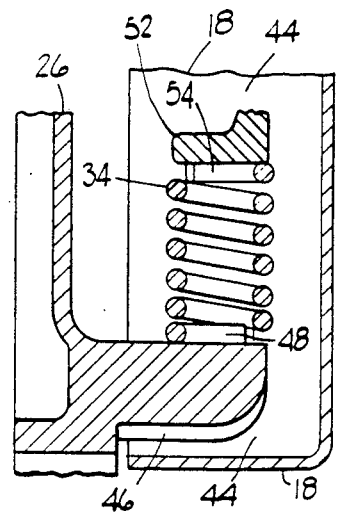
FIG.5

PULLEY ENCASED TENSIONER WITH DAMPING

BACKGROUND OF THE INVENTION

The invention relates to a tensioner for an endless power transmission member such as an endless belt, chain or the like and a power transmission system that includes such a tensioner and power transmission member such as a belt. More particularly, the invention relates to a spring type tensioner that biases the position of a pivot arm to which a pulley is rotatably mounted. While the tensioner of the invention may be used in various applications for tensioning an endless power transmission member, it is particularly useful as a compact tensioner in limited space applications for controlling tension of a toothed belt as associated with automotive camshaft drive systems.

In an automotive camshaft drive system, a toothed or synchronous belt is entrained around pulleys that include at least two toothed pulleys. One of the pulleys is a crank pulley and the other is one or more camshaft pulleys. An idler pulley such as a backside idler pulley may be pressed against the backside of the belt to effect an installed belt tension. Many automotive drive systems use a fixed idler pulley of the eccentric type where the eccentric pivot for the pulley lies radially inward of a bearing such as radially inward of the inner race of a ball type bearing. Since the pivot is radially inward of the bearing rotational surface, the bearings must be quite large to effect some amount of eccentricity for take up for tensioning a slacked belt. While a fixed eccentric type pulley does not introduce tension changes because of an angular positioning of a pivot arm because the eccentric is fixed, they do introduce another type of tension problem. The problem with a fixed eccentric type pulley is that there is a change in the belt drive pulley center distance between a cold engine such as usually occurs during engine start-up in a warm or thermally expanded engine such as occurs during normal engine operating temperatures. Thus, the thermal effect is to increase belt tension with engine temperature increases, and conversely, decrease belt tension with decreases in engine temperature. A self-adjusting belt tensioner can overcome such changes in the thermal affect between a hot engine and a cold engine.

An example of a self-adjusting timing belt tensioner is disclosed in U.S. Pat. No. 4,917,655. This tensioner being of the eccentric type with its pivot radially inward of the bearing surface, has the same disadvantage as a fixed eccentric type pulley and that is it requires a very large bearing. Typically, large bearings are usually more expensive than a smaller bearings. Also, in such self adjusting eccentric type tensioners, the length of the pivot arm effecting eccentricity is quite small. The short pivot arm length may limit the amount of available "take-up" and also introduce geometric force effects. Large angle changes of a short pivot arm must somehow be accounted for or balanced (e.g., with changing spring loads) for controlling belt tension.

U.S. Pat. Nos. 4,551,120 and 4,696,663 offer solutions to the short pivot arm of eccentric type tensioners by providing a longer pivot arm length. This is accomplished by locating the pivot radially outward of the pulley bearing surface. While such tensioners are compact, they are designed for front end accessory drive systems instead of timing belt systems and they have an axial length along the pivot axis which is quite deep. Such tensioners use a helically wound torsional springs to bias the positioning of the pivot arm. A housing for containing the torsional spring accounts for a large axial length. The axial length would make them unsuitable for some automotive belt tensioning applications because of insufficient space.

Another type of belt tensioner is disclosed in U.S. patent application Ser. Nos. 07/588,633 and 07/588,245. In these disclosures, the tensioners have a suitable axial length or depth for some automotive camshaft drive configurations, but their design introduces some geometric problems that may prevent them from being used in other applications. In both of the tensioners, the pulley is recessed in the tensioner structure to an extent that it is at least partially surrounded by projections of the tensioner's structure. Such projections must be avoided by a belt as it entrained around the tensioner pulley and other pulleys of the belt drives. The projections may substantially limit the applications for such tensioners because of space limitations of an automotive engine.

SUMMARY OF THE INVENTION

In accordance with the invention, a tensioner is provided that is useful in conjunction with belt drive systems and is particularly useful in a toothed belt or synchronous belt drive system such as an automotive camshaft drive. Such belt drives are often referred to as timing belt drives.

The belt tensioner of the invention is of the pivot type with a pivot arm pivotably mounted with a pivot to a base structure, and a pulley rotatably mounted to the pivot arm for engaging a belt. The pulley has generally a "tube-pan" configuration where it is open on an axial side to an annular space. A portion of the pivot protrudes into the annular space. A compression spring is interpositioned between a base structure and the pivot arm in such a manner to bias movement of the pivot arm. In accordance with the invention, part of the base structure and part of the pivot arm protrude into the annular space and the compression spring is interpositioned between such portions. At least part of a compression spring is also disposed in the annular space which gives the pulley a low or shallow axial profile in comparison to prior art tensioners.

An advantage of the invention is that the pulley is not recessed relative to other component parts of the tensioner.

Another advantage of the invention is that the pulley substantially encases a portion of the spring and pivot to effect a shallow tensioner profile while also providing shielding.

Another advantage of the invention over prior art eccentric type tensioners is that a relatively smaller diameter and therefore economical bearing may be used (in comparison to eccentric type tensioners) while also obtaining a substantially longer pivot arm.

An object of the invention is to locate at least a portion of the compression spring in the annular space of the pulley such that the spring is positioned generally chordally relative to the pulley.

These and other objects or advantages of the invention will be apparent after reviewing the drawings and description thereof wherein:

FIG. 1 is a schematic front view of a drive system that includes a belt entrained around pulleys and a tensioner of the invention;

FIG. 2 is a view taken along the line 2—2 of FIG. 1 showing a side view of the tensioner excluding the belt;

FIG. 3 is an enlarged cross-sectional view taken along the line 3—3 of FIG. 4;

FIG. 4 is a cross-sectional view taken along the line 4—4 of FIG. 3;

FIG. 5 is a partial cross-sectional view taken along the line 5—5 of FIG. 3 and further includes a superimposed partial cross-section of a pulley to show relative positioning of elements.

DESCRIPTION OF PREFERRED EMBODIMENTS

While various features of the tensioner and belt drive system are best described in conjunction with a synchronous belt drive (timing belt drive) for an automotive engine, features of the invention may also be used in other belt tensioning applications such as for automotive frontend accessory drives. Referring to FIG. 1, a synchronous belt drive system 10 is shown with a toothed belt 12 entrained and tensioned around toothed pulleys. The illustrated drive system is a camshaft drive of the automotive type that includes at least one toothed cam pulley 14, a crank pulley 16 and a tensioning pulley 18 of a tensioner 20 of the invention. The tensioner may be held in position by means of fasteners such as cap screws 22 which fasten the tensioner to an engine 24 (only partially shown).

As best shown in FIG. 2, the tensioner has a shallow axial depth or length and the pulley need not be recessed within other structural component parts of the tensioner. The tensioner design permits substantially 360 degrees access to the pulley which offers a variety of opportunities for designing various means for attaching the tensioner to an engine without creating obstructions that would interfere with a power transmission belt.

Referring to FIGS. 3-5, the belt tensioner 20 is of the spring bias type and includes a base structure that may optionally include ears 28, 30 as a means for attaching the tensioner, a pivot arm 32 and a spring 34 biased between the base structure and pivot arm. The pivot arm 32 is pivotably mounted to the base structure by means of a pivot 36 and an optional, self-lubricating polymeric sleeve-type bearing or bushing 38 that may include a thrust cap or bearing 40.

The pulley 18 is rotatably mounted to the pivot arm such as by means of a ball bearing 42. The pulley has generally a "tube-pan" configuration that opens on an axial side to an annular space 44. The base structure has a portion such as a post 46 that protrudes into the annular space and defines a means such as a boss 48 with a slot 50 for receiving an end of the spring that includes a diametrically oriented tab.

The pivot arm has a lever arm LV with a portion 52 that protrudes into the annular space 44 and includes a means such as a boss 54 with a slot 56 for receiving an end portion of the spring.

The spring is a compression spring that is sized to at least partially, and more preferably substantially fit in the annular space. The spring is interpositioned between the post 46 of the base structure and portion of the pivot arm such that it is oriented substantially chordally relative to the pulley and is interconnected between the spring mounting means 48, 54.

The spring is mounted to the base structure and pivot arm so that the spring articulates with movements of the pivot arm and the moment arm LV varies in length with articulated movements of the spring in a manner as described in U.S. patent application Ser. No. 07/588,245. The moment arm shortens with a shortening of length of the compression spring and lengthens with a lengthening of the compression spring as the pivot arm is pivoted.

A damping means 58 is included for inhibiting movement of the pivot arm and hence, the pulley against the belt when the tensioner is in use. The damping means includes a leg or lever extension 60 of the pivot arm, a damping spring 62, a surface 64 of the base structure, and a pad of friction material 66. Optionally, a second pad of friction material 68 may be used.

The pivot arm and base are cupped to clear the pulley and are nested together juxtaposed each other in the annular space 44. A portion of the pivot arm 70 protrudes into the annular space and preferably has a planer surface portion 72. Similarly, the base structure has a damping portion 74 that protrudes into the annular space and preferably has a flat or planer surface.

A pad of friction material 66 such as in the form of a washer is sandwiched between the planer surfaces 72, 76. A pin type fastener such as a threaded bolt, 78 extends through a slot 80 of the base portion 76 and fastens to the pivot arm portion 70. The bolt retains one end of the spring and is carried by the pivot arm as it arcuately moves about the pivot 36.

The fastener also functions to retain the pivot arm to the base structure. More than one layer of friction pad material may be used such as a second layer juxtaposed the spring. The pad of friction material may be oblong in shape or circular to provide a sufficiently large surface for damping to take place by friction surface sliding. The friction material may be of any chosen type but it optionally may be in the form of a polymeric material such as nylon that sold under the trademark Delrin which exhibits a starting (static) friction that is less than its sliding (dynamic) friction.

For convenience, the base structure of FIGS. 4 and 5 are shown in vertical alignment so that the relative positioning of the compression spring 34, bearing 42 and damping means 58 may be seen to be preferably aligned with each other in a substantially constant plane. Such alignment minimizes forces which must be carried by the parts as it eliminates loads that could be introduced by couples due to offsetting of the components.

To illustrate the compactness of the tensioner of the invention, a tensioner was constructed with a pulley having a diameter of 104 mm and an axial face width of 36 mm. Yet the tensioner had a total axial length of only 56 mm. The short axial length was possible by using a compression spring having a diameter of 19 mm and a nominal compressed length of 32 mm. The spring was chordally fit within the annular space of the generally tube-pan shaped pulley. Thus, the ratio of the tensioner axial length to pulley diameter is only 0.54. When installed in a belt drive system, the tensioner operates to maintain an 80 lb. tension within a design tolerance of ±10 percent.

The foregoing detailed description is made for the purpose of illustration only and is not intended to limit the scope of the appended claims.

What is claimed is:

1. In a tensioner for tensioning a flexible power transmission member and of the type with a base structure; a pivot arm pivotably mounted with a pivot to the base structure; pulley means rotatably mounted to the base structure for engaging the power transmission member and having a generally tube-pan configuration that opens on an axial side to an annular space, a portion of the pivot protruding into the annular space; a spring means between the base structure and pivot arm for biasing the position of the pivot arm; and means for damping movement of the pivot arm, the improvement comprising:

the pivot arm having a first lever arm with a portion that protrudes into the annular space and defines a first means for connecting a spring;

the base structure with a portion that protrudes into the annular space and defines a second means for connecting a spring, and a compression spring oriented substantially chordally relative to the pulley and at least partially disposed in the annular space and interconnected between the first and second connecting means.

2. The tensioner as claimed in claim 1 wherein the spring is disposed in the annular space.

3. The tensioner as claimed in claim 1 wherein the damping means includes:

the pivot arm having a second lever arm with a damping portion that protrudes into the annular space;

the base structure with a damping portion that protrudes into the annular space juxtaposed the pivot arm damping portion;

a layer of friction material interpositioned between the pivot arm damping portion and the base damping portion; and spring means for biasing the pivot arm damping portion, the base structure damping portion and the friction material into contact with each other to effect damping.

4. The tensioner as claimed in claim 3 wherein:

the base structure damping portion has a substantially planer surface with a slotted aperture;

the layer of friction material has an aperture aligned with the planer surface slotted aperture;

the pivot arm damping portion has a substantially planer surface and a pin that extends through the slotted aperture of the base and aperture of the layer of friction material;

a compression spring positioned around and retained by the pin and biasing the pivot arm damping portion, the layer of friction material, and the base structure damping portion against each other.

5. In a belt drive system of the type with a belt entrained around pulleys and tensioned between two spans of the belt by means of a tensioner of the type with a base structure; a pivot arm pivotably mounted with a pivot to the base structure; pulley means rotatably mounted to the pivot arm for engaging the power transmission member and having a generally tube-pan configuration that opens on an axial side to an annular space, a portion of the pivot protruding into the annular space; a spring means between the base structure and pivot arm for biasing the position of the pivot arm; and means for damping movement of the pivot arm, the improvement comprising:

the pivot arm having a first lever arm with a portion that protrudes into the annular space and defines a first means for connecting a spring;

the base structure with a portion that protrudes into the annular space and defines a second means for connecting a spring, and a compression spring oriented substantially chordally relative to the pulley and at least partially disposed in the annular space and interconnected between the first and second connecting means.

6. The belt drive system as claimed in claim 5 wherein the spring is disposed in the annular space.

7. The belt drive system as claimed in claim 5 wherein the damping means includes:

the pivot arm having a second lever arm with a damping portion that protrudes into the annular space;

the base structure with a damping portion that protrudes into the annular space juxtaposed the pivot arm damping portion;

a layer of friction material interpositioned between the pivot arm damping portion and the base damping portion; and spring means for biasing the pivot arm damping portion, the base structure damping portion and the friction material into contact with each other to effect damping.

8. The belt drive system as claimed in claim 7 wherein:

the base structure damping portion has a substantially planer surface with a slotted aperture;

the layer of friction material has a slotted aperture aligned with the planer surface slotted aperture;

the pivot arm damping portion has a substantially planer surface and a pin that extends through both slotted apertures of the base and layer of friction material;

a compression spring positioned around and retained by the pin biasing the pivot arm damping portion, the layer of friction material, and the base structure damping portion against each other.

* * * * *